US008902732B2

(12) United States Patent
Van Gruenen et al.

(10) Patent No.: US 8,902,732 B2
(45) Date of Patent: Dec. 2, 2014

(54) SYSTEM AND METHOD FOR MANAGING ACCESS POINT FAILOVER WITHIN A WIRELESS MESH NETWORK

(71) Applicant: Silver Spring Networks, Inc., Redwood City, CA (US)

(72) Inventors: Jana Van Gruenen, Woodside, CA (US); Sterling Hughes, Oakland, CA (US); Peter Hunt, Sunnyvale, CA (US); Chris Collins, San Jose, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 250 days.

(21) Appl. No.: 13/625,762

(22) Filed: Sep. 24, 2012

(65) Prior Publication Data

US 2014/0086042 A1 Mar. 27, 2014

(51) Int. Cl.
*G06F 11/07* (2006.01)
*H04W 36/08* (2009.01)
*H04W 72/04* (2009.01)
*H04L 12/707* (2013.01)

(52) U.S. Cl.
CPC .......... *H04W 36/08* (2013.01); *H04W 72/0426* (2013.01); *H04L 45/22* (2013.01)
USPC .......................................... 370/221; 370/331

(58) Field of Classification Search
CPC ... H04W 72/0426; H04W 36/08; H04L 45/28
USPC ................ 370/217–220, 221–222, 225–228, 370/328–339
See application file for complete search history.

(56) References Cited

U.S. PATENT DOCUMENTS

| 8,099,096 | B2 * | 1/2012 | Prakash et al. | 455/437 |
|---|---|---|---|---|
| 2005/0220054 | A1 * | 10/2005 | Meier et al. | 370/331 |
| 2007/0286126 | A1 * | 12/2007 | Prakash et al. | 370/331 |
| 2009/0286534 | A1 * | 11/2009 | Garg et al. | 455/432.1 |
| 2010/0110903 | A1 * | 5/2010 | Spott et al. | 370/244 |
| 2011/0216645 | A1 * | 9/2011 | Song et al. | 370/216 |
| 2011/0307546 | A1 * | 12/2011 | Iovene et al. | 709/203 |
| 2013/0259005 | A1 * | 10/2013 | Kulkarni | 370/332 |
| 2013/0343178 | A1 * | 12/2013 | Ankaiah et al. | 370/221 |
| 2014/0113623 | A1 * | 4/2014 | Garg et al. | 455/432.1 |

* cited by examiner

*Primary Examiner* — Kevin Mew
(74) *Attorney, Agent, or Firm* — Patterson & Sheridan, LLP

(57) ABSTRACT

A node within a wireless mesh network is configured to select a primary path through an access point and to designate that access point as the primary access point for the node. The access point then transmits a failover message indicating that the node designated that access point as the primary access point for the node at a particular time. When another access point receives the failover message, the other access point may determine that the first node has also designated the other access point as the primary access point for the node, and may then de-register the node and stop advertising a primary path to the node.

20 Claims, 6 Drawing Sheets

SYSTEM AND METHOD FOR MANAGING ACCESS POINT FAILOVER WITHIN A WIRELESS MESH NETWORK

BACKGROUND OF THE INVENTION

1. Field of the Invention

Embodiments of the present invention relate generally to wireless digital communication and more specifically to a system and method for managing access point failover within a wireless mesh network.

2. Description of the Related Art

A conventional wireless mesh network includes a plurality of nodes configured to communicate with one another and with one or more access points coupled to the wireless mesh network. Nodes may communicate with a particular access point either directly, or indirectly by way of other nodes within the wireless network. For example, a given node may transmit data to a neighboring node, and the neighboring node may then forward the data to the access point.

The sequence of nodes used to communicate with an access point across the wireless mesh network is known as a "path." A given node typically selects a "primary" path that is preferentially used to communicate with a "primary" access point. When the node selects a primary access point and a corresponding primary path, the node registers with the primary access point, thereby notifying the access point that the node may be reached via the primary path. The primary access point may then advertise to an upstream router that the node is reachable through that path.

Occasionally, the primary path selected by a node may become unavailable due to, e.g., a hardware failure associated with nodes in the path, among other problems. In such situations, the node may register with a second primary access point corresponding to a second primary path. The second primary access point may then advertise to the upstream router that the node may be reached through the second primary path. Ideally, the node also de-registers with the original primary access point, notifying the original primary access point that the node is no longer reachable through the associated path.

However, under certain circumstances, the node cannot successfully de-register from the original primary access point, resulting in a situation where both the original primary access point and the new primary access point advertise to the upstream router different primary paths to the node. The router has no way of selecting the "correct" primary path and may become deadlocked when provided with two alternative primary paths to the node. Consequently, the node may become unreachable for a period of time, which may diminish the overall throughput of the wireless mesh network.

As the foregoing illustrates, what is needed in the art is an improved technique for managing access point failover within a wireless mesh network.

SUMMARY OF THE INVENTION

One embodiment of the present invention sets forth a computer-implemented method for de-registering a node residing within a network from a first access point coupled to the network when the first access point incurs a network communication failure. A reflective method includes receiving a failover message from a second access point coupled to the network indicating that the node designated the second access point as a primary access point for the node at time t1, reading an entry in a registration table indicating that the node designated the first access point as the primary access point for the node at time t0, determining that time t0 occurred prior to time t1, and de-registering the node from the first access point by removing the entry from the registration table.

Advantageously, when a node cannot successfully de-register from a pre-existing primary access point, a newly selected primary access point is capable of notifying the pre-existing access point that the node should be de-registered, thereby avoiding a situation where both access points advertise separate primary paths to the node. Consequently, situations where nodes become unreachable due to having multiple advertised primary paths can be avoided entirely, thereby preserving a high throughput within the network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
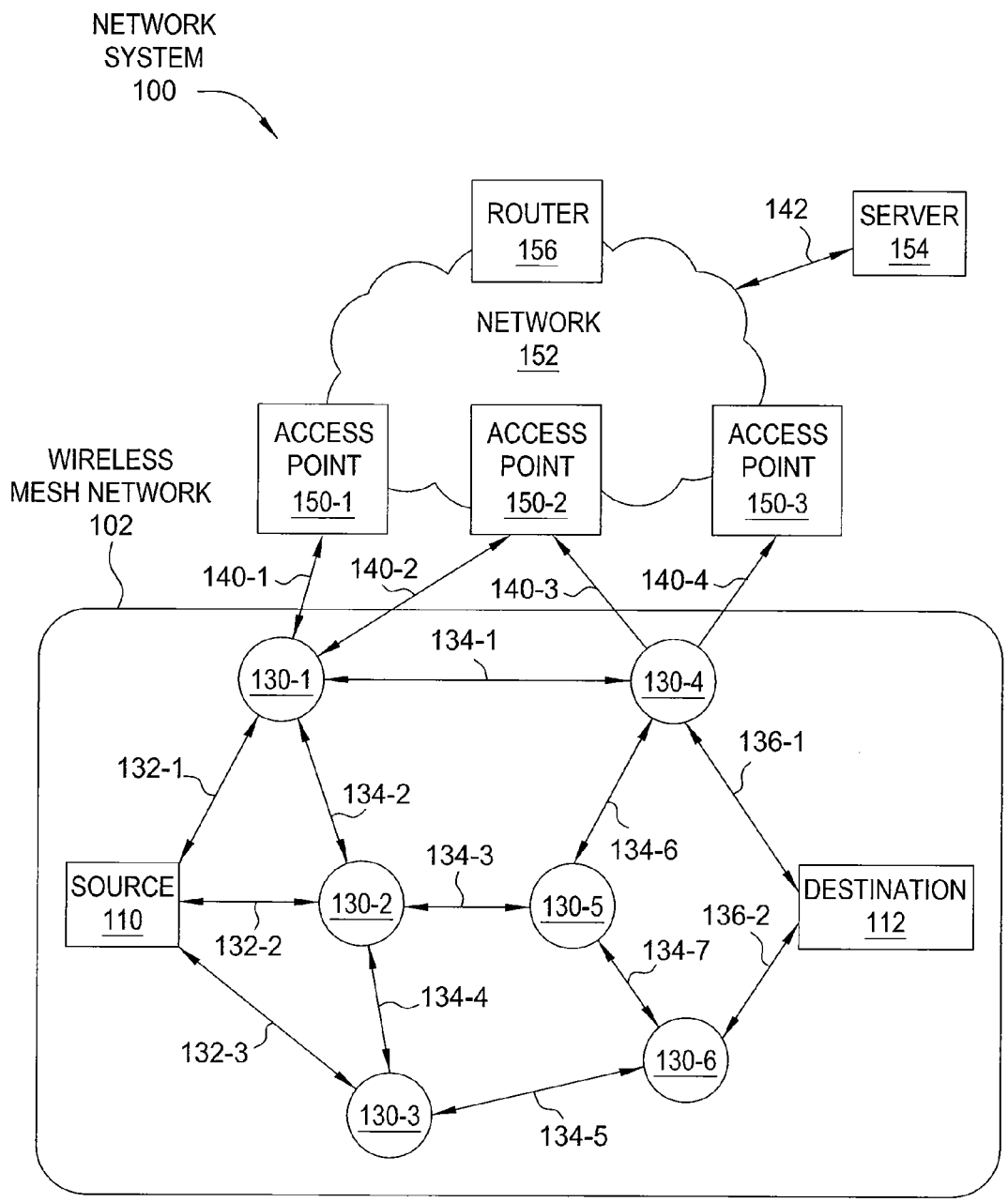
FIG. 1 illustrates a network system, according to one embodiment of the invention.

FIG. 1 illustrates a network system 100, according to one embodiment of the invention. The network system 100 comprises a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include one or more access points 150, a network 152, a server 154, and a router 156.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

Each of the access points 150-1, 150-2, and 150-3 is configured to communicate with at least one node within the wireless mesh network 102, such as intermediate node 130-4. Communication may include transmission of payload data, timing data, or any other technically relevant data between a given access point 150 and nodes within the wireless mesh network 102. For example, communications link 140-3 may be established between the access point 150-2 and intermediate node 130-4 to facilitate transmission of payload data between wireless mesh network 102 and network 152. In general, communications links 140 may be established between access points 150 and a subset of the nodes 130. The network 152 is coupled to the server 154 via communications link 142. The access point 150 is coupled to the network 152, which may comprise any wired, optical, wireless, or hybrid network configured to transmit payload data between the access point 150 and the server 154, e.g. via router 156.

Each node 130 is configured to select both primary and secondary paths to access points 150 based on cost values associated with the various available paths. When a node 130 selects a primary path, the node 130 transmits a registration message to the access point 150 associated with the primary path, thereby designating that access point as the primary access point for that node. Likewise, when a node 130 selects a secondary path, the node 130 transmits a registration message to the access point 150 associated with the secondary path, thereby designating that access point as the primary access point for that node. When the primary path associated with a node becomes unavailable, the node 130 may immediately resume data communications via the secondary path and corresponding access point 150 by re-registering with the secondary access point and designating that access point as a new primary access point for the node 130. Alternatively, the node 130 may identify another access point 150 and designate that access point as the new primary access point via the registration process outlined above.

Under ideal conditions, the node 130 also de-registers with the original primary access point. However, in situations where the de-registration process cannot occur (e.g. due to a hardware failure within network system 100), when node 130 registers with the new primary access point 150, that access point 150 may transmit a failover message to all other access points 150 notifying those access points that the node 130 has changed primary access points, as described in greater detail below in conjunction with FIGS. 3-6.

The server 154 may represent a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting. The network 152 also includes router 156 configured to route data between the server 154 and various nodes 130 via access points 150. When a given access point 150 is designated as a primary access point by a particular node 130, as described above, the access point 150 advertises to the router 156 that the node is reachable via that access point 150.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. An exemplary network interface is described below in conjunction with FIG. 2.

Figure 2:
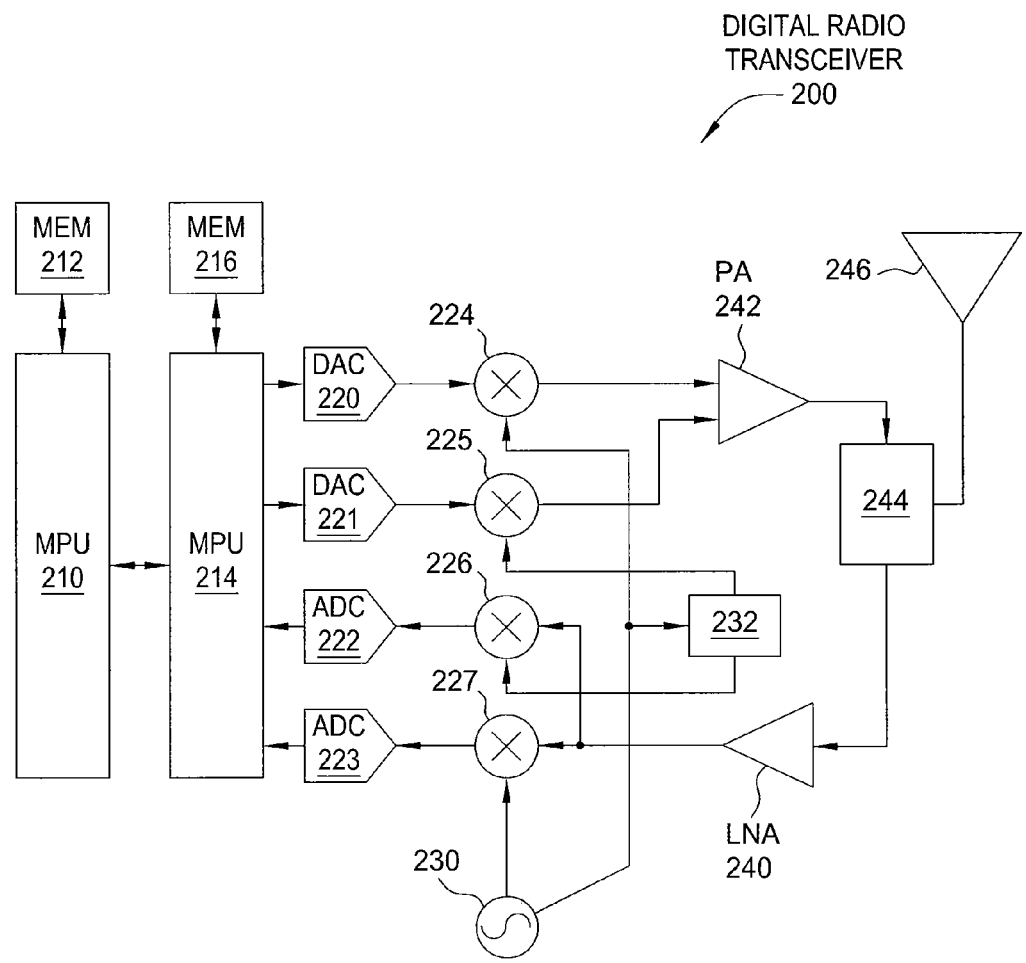
FIG. 2 illustrates a network interface configured to transmit and receive data within a mesh network, according to one embodiment of the invention.

FIG. 2 illustrates a network interface 200 configured to implement multi-channel operation, according to one embodiment of the invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 3-4, when MPU 210 executes a firmware program stored in memory within network interface 200.

The DSP 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Figure 3:
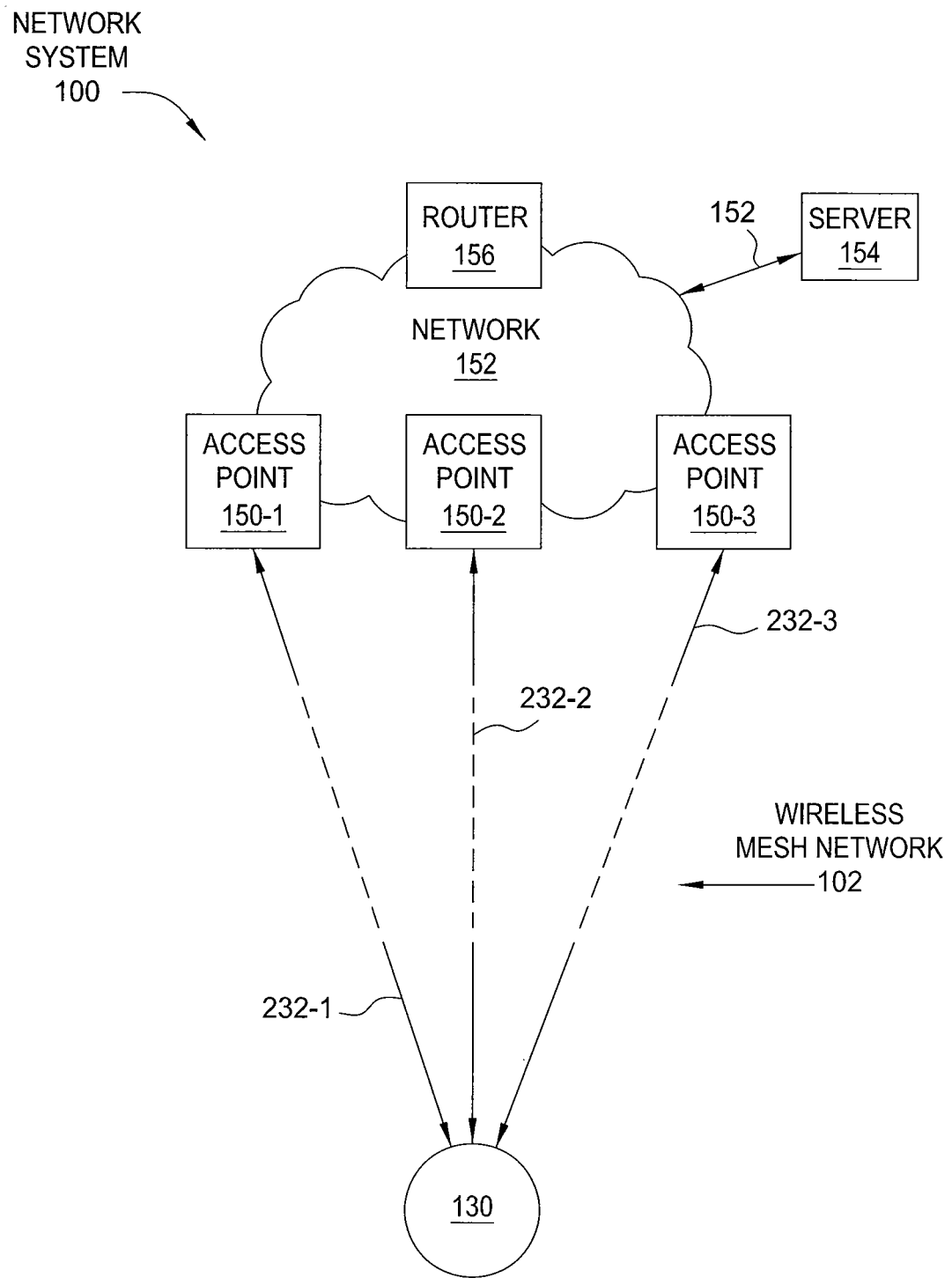
FIG. 3 illustrates a simplified representation of the network system of FIG. 1, according to one embodiment of the invention.

FIG. 3 illustrates a simplified representation of the network system of FIG. 1, according to one embodiment of the invention. Some of the elements present in FIG. 1 have been omitted for clarity, while certain other elements have been added. As shown, wireless mesh network 102 now includes a single representative node 130, as well as various paths 232. Each path 232 couples the node 130 with a different access point 150. Path 232-1 couples node 130 with access point 150-1, path 232-2 couples node 130 with access point 150-2, and path 232-3 couples node 130 with access point 150-3. Each path 232 may be an indirect path across wireless mesh network 102, i.e. a path that includes one or more other nodes 130 configured to forward data along that path. The node 130 may be any of the nodes 130 shown in FIG. 1.

As discussed above in conjunction with FIG. 1, node 130 is configured to select a primary path across which data communications preferentially occur. As also noted above, node 130 is configured to maintain a secondary path that represents a "backup" path that may be used in situations where the primary path becomes unavailable. When a node 130 switches paths from a primary path to secondary path, or from a primary path to any other path, the node 130 attempts to de-register with the primary access point associated with that primary path and to register with another access point 150 associated with the new path.

When the node 130 registers with a given access point 150 (e.g. by transmitting a registration message to that access point 150), the access point 150 records a time when the registration occurred for the node 130 and whether the node 130 has designated the access point 150 as a primary access point or a secondary access point. The access point 150 could, for example, maintain a registration database of nodes that have registered with the access point 150, times when those nodes registered, and whether each node designated the access point 150 as a primary or secondary access point. The access point 150 may then advertise to the router 156 a primary path or a secondary path to the node 130, whichever the case may be.

Additionally, when the node 130 registers with the access point 150, the access point 150 transmits failover message to other access points coupled to the wireless mesh network 102, as discussed above, notifying those access points that the node 130 has registered with that access point 150 and designated that access point 150 as either a primary access point or a secondary access point, whichever the case may be. By notifying the other access points that the node 130 has registered with the access point 150, the other access points may de-register the node 130 and stop advertising to the router 156 primary or secondary paths to that node. In one embodiment, the failover message is a user datagram protocol (UDP) message. A given access point 150 may multicast the failover message to other access points residing on the same LAN, i.e. via a link-layer multicast, and may also multicast the failover message to other access points residing on a WAN, i.e. via a global multicast.

In the exemplary embodiment shown in FIG. 3, the node 130 could select path 232-1 as a primary path and register with access point 150-1 as a primary access point. The node 130 could also select path 232-1 as a secondary path and register with access point 150-1 as a secondary access point. Access points 150-1 and 150-2 may then advertise to router 156 primary and secondary paths to node 130, respectively.

In one exemplary situation, primary path 232-1 could become unavailable, thereby interrupting data communications between node 130 and access point 150-1. Since data communications between node 130 and access point 150-1 cannot occur, node 130 may not be able to de-register from access point 150-1. Nonetheless, node 130 may resume data communications via secondary path 232-2. In doing so, node 130 may re-register with access point 150-2 and designate access point 150-2 as a new primary access point, thereby "promoting" secondary path 232-2 to a new primary path. When node 130 re-registers with access point 150-2, access point 150-2 updates the registration database maintained by that access point and then transmits a failover message to access points 150-1 and 150-3 via network 152. The failover message notifies those access points that node 130 has re-registered with access point 150-2 and designated that access point as the primary access point for node 130 at a particular time. When access point 150-1 receives the failover message, access point 150-1 consults the registration database maintained by that access point and determines that the node 130 is currently registered with access point 150-1 and has designated that access point as a primary access point. Further, access point 150-1 also determines that the registration indicated in the failover message occurred more recently than the registration recorded in the registration database maintained by access point 150-1. Accordingly, access point 150-1 determines that the recorded registration for node 130 is outdated, and, in response, may then de-register the node 130 and stop advertising to the router 156 that the node 130-1 is reachable via access point 150-1.

In another exemplary situation, primary path 232-1 could become unavailable, and node 130 could then determine that path 232-3 has a lower cost value than the secondary path 232-2. Accordingly, node 130 may register with access point 150-3 and designate that access point as the new primary access point for the node. Access point 150-3 updates the registration database maintained by that access point and then transmits a failover message to the other access points 150. Access point 150-1 would respond in like fashion as described above and take steps to de-register the node 130.

Access point 150-3 may then advertise to router 156 a primary path to node 130 without risk of providing conflicting advertisements to the router 156. In this situation, the secondary access point 150-2 does not need to take any action and simply remains the secondary access point for the node 130.

In one embodiment, when an access point 150 advertises a primary or secondary path to the router 156 that may be used to reach node 130, access point 150 implements a router information protocol (RIP) message than specifies a cost value associated with the advertised path. When an access point 150 advertises a primary path, the access point may advertise the path as having a cost of "5". When access point 150 advertises a secondary path, the access point may advertise the path as having a cost of "6". The router 156 selects a path to the node 130 based on the advertised path costs. In a further embodiment, when an access point 150 is newly designated as a primary access point for the node 130, that access point 130 may temporarily advertise a path cost of "4" to the router 156. By implementing this technique, the access point 150 causes the router to ignore any outdated primary path advertisements (i.e. those with a path cost of "5"), and to selectively route traffic across the new primary path. Once the newly designated primary access point has successfully transmitted a failover message to the other access points, and those access points have de-registered the node 130, as discussed above, the newly designated primary access point may advertise the primary path to the node as having a cost of "5".

The techniques described above for switching primary paths, transmitting a failover message, and de-registering a node are also described in greater detail below in conjunction with FIGS. 4, 5, and 6, respectively.

Figure 4:
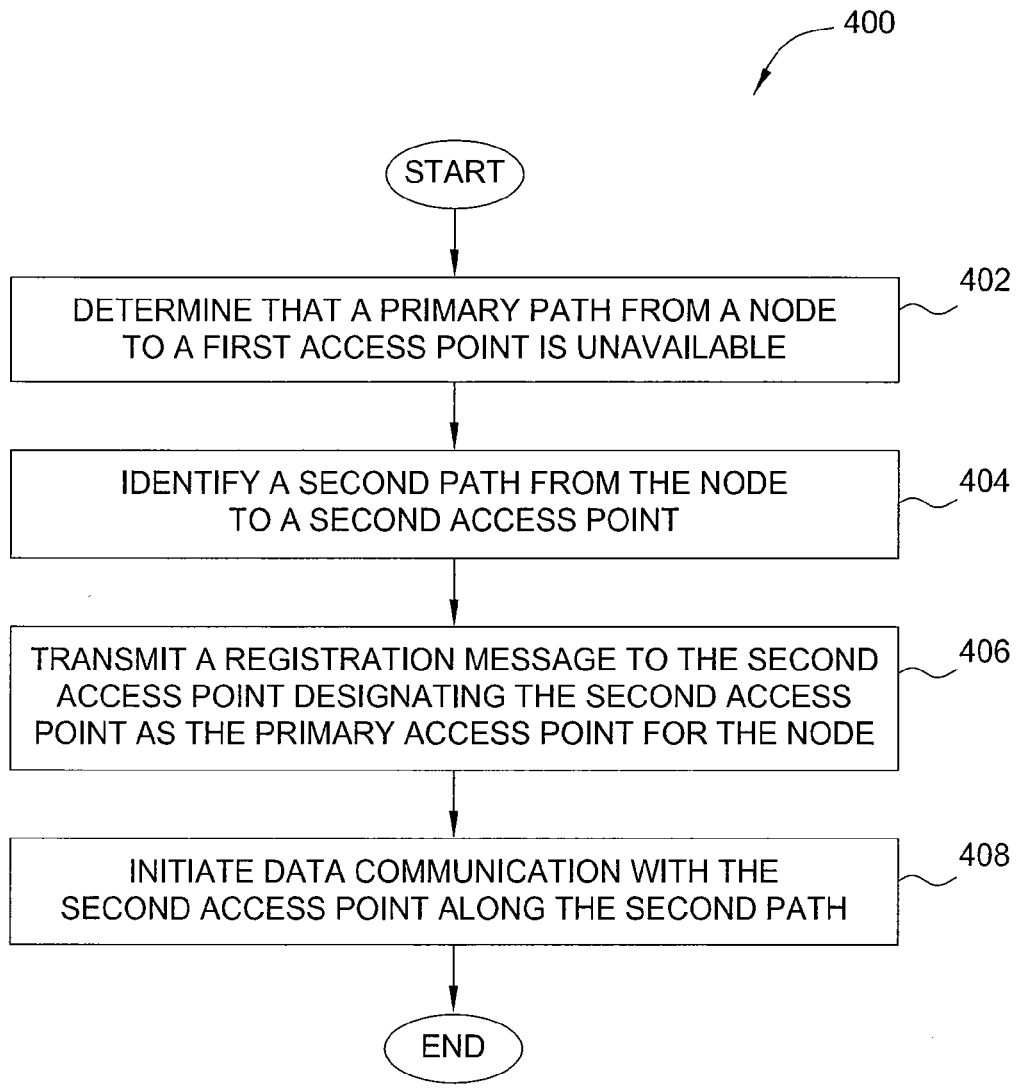
FIG. 4 is a flowchart of method steps for changing the primary path of a node, according to one embodiment of the invention.

FIG. 4 is a flowchart of method steps for changing the primary path of a node, according to one embodiment of the invention. Although the method steps are described in conjunction with the systems of FIGS. 1-3, persons of ordinary skill in the art will understand that any system configured to perform the method steps, in any order, is within the scope of the present invention. The method steps may be performed by any of the nodes within wireless mesh network 102, including nodes 110, 112, or 130.

As shown, a method 400 begins at step 402, where a node 130 within wireless mesh network 102 determines that a primary path to an access point 150 is unavailable. The primary path could become unavailable due to, e.g., a hardware failure associated with another node 130 within the primary path. In one embodiment, at step 402, the node 130 determines that another path exists having a lower cost than the existing primary path instead of determining that the primary path is unavailable.

At step 404, the node 130 identifies a second path to a second access point 150. In one embodiment, the node 130 maintains a secondary path in addition to the primary path, and when the primary path becomes unavailable at step 402, the node 130 falls back to the secondary path immediately at step 404.

At step 406, the node 130 transmits a registration message to the second access point designating the second access point as the primary access point for the node 130. The second access point may then advertise to an upstream router, such as router 156, that the node 130 may be reached via the second access point and the second path.

At step 408, the node 130 initiates data communication with the second access point along the second path. The router 156 may then send and receive data to and from the node 130. The method 400 then ends.

When the second access point receives the registration message, the second access point transmits a failover message indicating that the node has registered with the second access point and has designated that access point as the primary access point for the node 130, as described in greater detail below in conjunction with FIG. 5.

Figure 5:
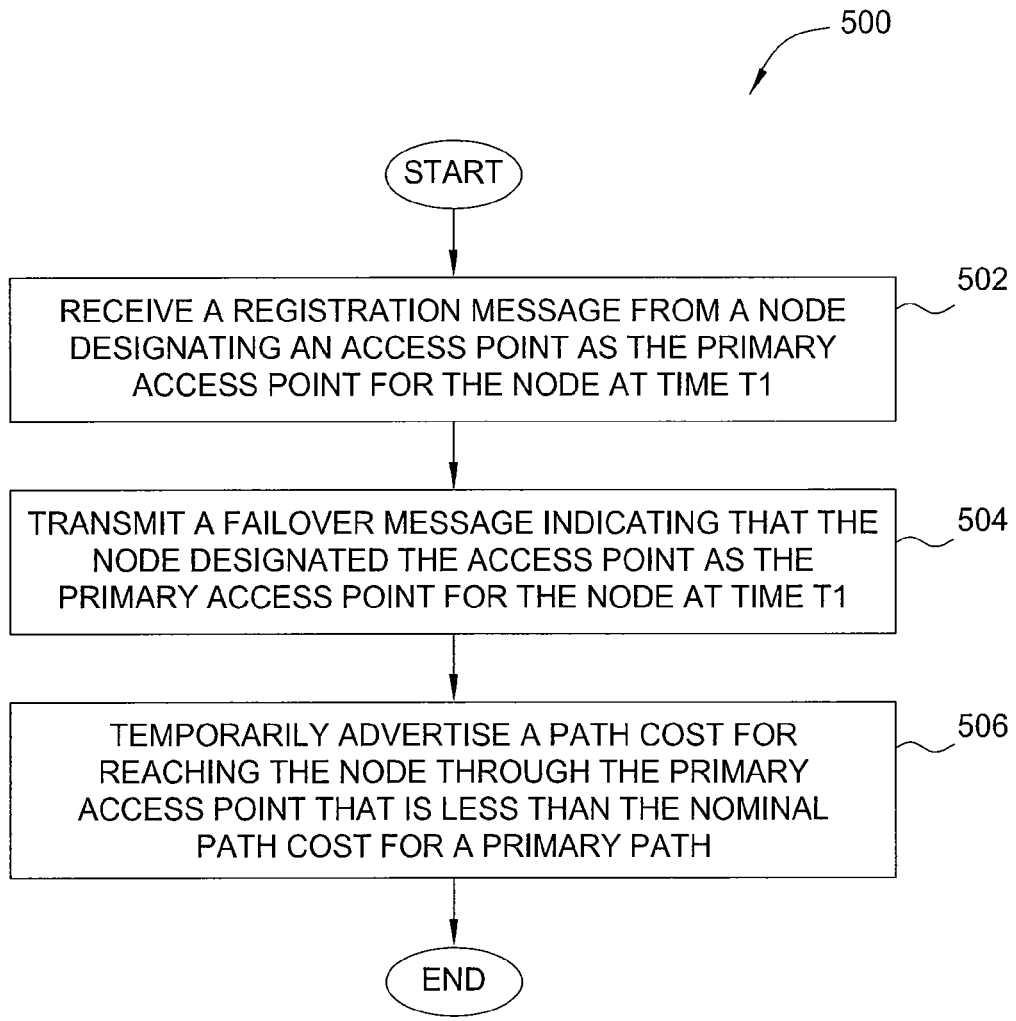
FIG. 5 is a flowchart of method steps for transmitting a failover message indicating that an access point has been designated as a primary access point, according to one embodiment of the invention.

FIG. 5 is a flowchart of method steps for transmitting a failover message indicating that an access point has been designated as a primary access point, according to one embodiment of the invention. Although the method steps are described in conjunction with the systems of FIGS. 1-3, persons of ordinary skill in the art will understand that any system configured to perform the method steps, in any order, is within the scope of the present invention. The method steps may be performed by any of the access points 150 within network system 100.

As shown, a method 500 begins at step 502, where an access point 150 receives a registration message from a node 130 designating the access point 130 as the primary access point for the node 130 at time t1. At step 504, the access point 150 transmits a failover message indicating that the node designated the access point as the primary access point for the node at time t1. The failover message could be, for example, a UDP message multicast across a LAN or a WAN to one or more other access points. At step 506, the access point 150 temporarily advertises a path cost for the primary path through the access point 150 to the node that is less than the nominal path cost for a primary path. In one embodiment, the advertisement is a RIP message that is sent to router 156 and indicates that the path cost for the primary path through the access point 150 is "4". After a time interval, the access point 150 advertises the cost of the primary path to the node as "5". The method 500 then ends.

Figure 6:
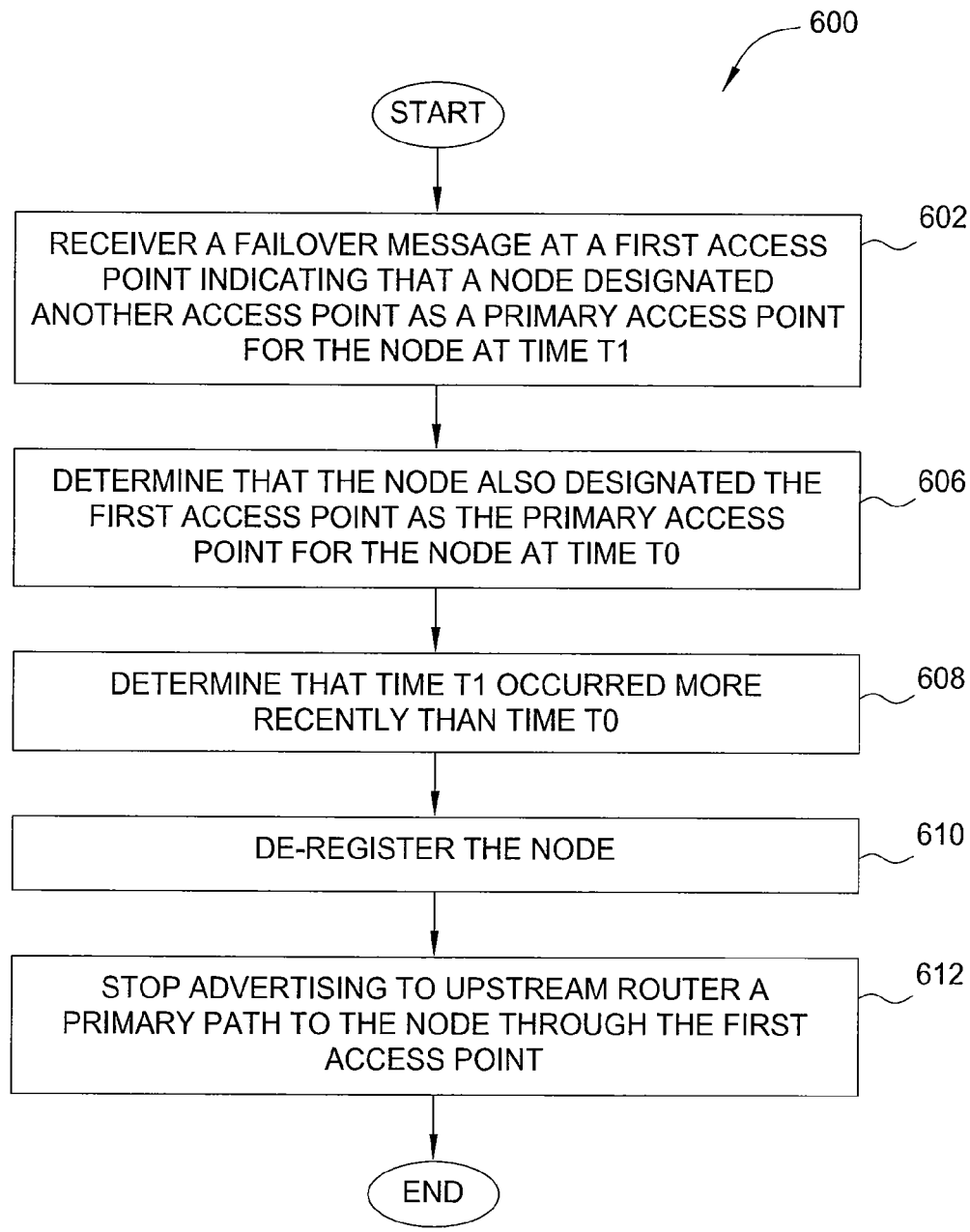
FIG. 6 is a flowchart of method steps for determining that an access point is no longer the primary access point for a node, according to one embodiment of the invention.

FIG. 6 is a flowchart of method steps for determining that an access point is no longer the primary access point for a node, according to one embodiment of the invention. Although the method steps are described in conjunction with the systems of FIGS. 1-3, persons of ordinary skill in the art will understand that any system configured to perform the method steps, in any order, is within the scope of the present invention. The method steps may be performed by any of the access points 150 within network system 100.

As shown, a method 600 begins at step 602, where a first access point 150 receives a failover message indicating that a node 130 designated another access point 150 as the primary access point for that node 130 at time t1. At step 606, the first access point 150 determines that the node 130 also designated the first access point 150 as the primary access point for the node 130 at time t0. The access point 150 could for example, consult a registration table indicating which nodes 130 have registered with that access point 150 and the times when those nodes registered. At step 608, the first access point 150 determines that time t1 occurred more recently than time t0. In this situation, the node 130 is registered with the first access point 150 and the other access point 150 simultaneously, and both of those access points 150 have been designated as the primary access point for the node 130. At step 610, the first access point 150 de-registers the node 130. That access point could, for example, remove an entry associated with the node 130 from the registration table maintained by the access point 150. At step 612, the first access point stops advertising to the router 156 that the node 130 may be reached via a primary path through the first access point 150, thereby avoiding a situation where the router 156 cannot select a primary path to the node 130.

In sum, a node within a wireless mesh network is configured to select a primary path through an access point and to designate that access point as the primary access point for the node. The access point then transmits a failover message indicating that the node designated that access point as the primary access point for the node at a particular time. When another access point receives the failover message, the other access point may determine that the first node has also designated the other access point as the primary access point for the node, and may then de-register the node and stop advertising a primary path to the node.

Advantageously, when a node cannot successfully de-register from a pre-existing primary access point, a newly selected primary access point is capable of notifying the pre-existing access point that the node should be de-registered, thereby avoiding a situation where both access points advertise separate primary paths to the node. Consequently, situations where nodes become unreachable due to having multiple advertised primary paths can be avoided entirely, thereby preserving a high throughput within the network.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for de-registering a node residing within a network from a first access point coupled to the network when the first access point incurs a network communication failure, the method comprising:
receiving a failover message from a second access point coupled to the network indicating that the node, at time t1, had designated the second access point as a primary access point for the node;
reading an entry in a registration table indicating that the node, at time t0, had designated the first access point as the primary access point for the node;
determining that time t0 occurred prior to time t1; and
de-registering the node from the first access point by removing the entry from the registration table.

2. The computer-implemented method of claim 1, further comprising causing the first access point to terminate advertising a primary path cost for reaching the node to an upstream router.

3. The computer-implemented method of claim 1, further comprising:
receiving, at time t1, a registration message from the node designating the second access point as the primary access point for the node;
transmitting the failover message to the first node; and
advertising to an upstream router a primary path cost for reaching the node that is less than another primary path cost for reaching the node that had been advertised to the upstream router by the first access point.

4. The computer-implemented method of claim 1, wherein, prior to time t0, the second access point is designated by the node as a secondary access point for the node, and, after time t0, another access point is designated as the secondary access point for the node.

5. The computer implemented method of claim 1, wherein the failover message comprises a user datagram protocol (UDP) message, and the first access point and the second access point are configured to advertise costs for reaching the node to the upstream router path using router information protocol (RIP) messages.

6. The computer-implemented method of claim 1, wherein the first access point and the second access point reside on the same local area network (LAN), and the failover message comprises a link-layer multicast.

7. The computer implemented method of claim 1, wherein the first and second access points reside on the same wide-area network (WAN), and the failover message comprises a global multicast.

8. A non-transitory computer-readable medium storing program instructions that, when executed by a processing unit, cause the processing unit to de-register a node residing within a network from a first access point coupled to the network when the first access point incurs a network communication failure, by performing the steps of:
receiving a failover message from a second access point coupled to the network indicating that the node, at time t1, had designated the second access point as a primary access point for the node;
reading an entry in a registration table indicating that the node, at time t0, had designated the first access point as the primary access point for the node;
determining that time t0 occurred prior to time t1; and
de-registering the node from the first access point by removing the entry from the registration table.

9. The non-transitory computer-readable medium of claim 8, further comprising the step of causing the first access point to terminate advertising a primary path cost for reaching the node to an upstream router.

10. The non-transitory computer-readable medium of claim 8, further comprising the steps of:
receiving, at time t1, a registration message from the node designating the second access point as the primary access point for the node;
transmitting the failover message to the first node; and
advertising to an upstream router a primary path cost for reaching the node that is less than another primary path cost for reaching the node that had been advertised to the upstream router by the first access point.

11. The non-transitory computer-readable medium of claim 8, wherein, prior to time t0, the second access point is designated by the node as a secondary access point for the node, and, after time t0, another access point is designated as the secondary access point for the node.

12. The non-transitory computer-readable medium of claim 8, wherein the failover message comprises a user datagram protocol (UDP) message, and the first access point and the second access point are configured to advertise costs for reaching the node to the upstream router path using router information protocol (RIP) messages.

13. The non-transitory computer-readable medium of claim 8, wherein the first and second access points reside on the same local area network (LAN), and the failover message comprises a link-layer multicast.

14. The non-transitory computer-readable medium of claim 8, wherein the first and second access points reside on the same wide-area network (WAN), and the failover message comprises a global multicast.

15. A computing device coupled to a network and configured to de-register a node residing within a network from the computing device, including:
a processor configured to:
receive a failover message from an access point coupled to the network indicating that the node, at time t1, had designated the access point as a primary access point for the node;
read an entry in a registration table indicating that the node, at time t0, had designated the computing device as the primary access point for the node;
determine that time t0 occurred prior to time t1; and
de-register the node by removing the entry from the registration table.

16. The computing device of claim 15, further comprising:
a memory unit coupled to the processing unit and storing program instructions that, when executed by the processing unit, cause the processing unit to:
receive the failover message;
read the entry in the registration table;
determine that time t0 occurred prior to time t1; and
de-register the node.

17. The computing device of claim 15, wherein the processor is further configured to terminate advertising a primary path cost for reaching the node to an upstream router.

18. The computing device of claim 15, wherein the access point is configured to:
receive, at time t1, a registration message from the node designating the second access point as the primary access point for the node;
transmit the failover message to the first node; and
advertise to an upstream router a primary path cost for reaching the node that is less than another primary path cost for reaching the node that had been advertised to the upstream router by the first access point.

19. The computing device of claim 15, wherein prior to time t0, the second access point is designated by the node as a secondary access point for the node, and after time t0, another access point is designated as the secondary access point for the node.

20. The computing device of claim 15, wherein the failover message comprises a user datagram protocol (UDP) message, and the computing device and the access point are configured to advertise costs for reaching the node to the upstream router path using router information protocol (RIP) messages, wherein the computing device and the access point (i) reside on the same local area network (LAN) and the failover message comprises a link-layer multicast, or (ii) the computing device and the access point reside on the same wide-area network (WAN) and the failover message comprises a global multicast, and wherein the network comprises a wireless mesh network configured to manage an electricity distribution infrastructure.

* * * * *